United States Patent [19]

Schukei

[11] 3,768,668
[45] Oct. 30, 1973

[54] FUEL BUNDLE AND CONTROL ELEMENT ASSEMBLY HANDLING MECHANISM

[75] Inventor: Glen Elwin Schukei, South Windsor, Conn.

[73] Assignee: Combustion Engineering, Inc., Windsor, Conn.

[22] Filed: Dec. 17, 1971

[21] Appl. No.: 209,103

[52] U.S. Cl. .................... 214/27, 176/30, 212/129, 214/18 N, 214/658
[51] Int. Cl. ............................................. B66c 19/00
[58] Field of Search .................... 176/30; 214/18 N, 214/27, 658, 1 P; 294/86 R, 86.12, 86 A; 212/129

[56] References Cited
UNITED STATES PATENTS

| | | | |
|---|---|---|---|
| 3,691,011 | 9/1972 | Kruger et al. ................ | 214/18 N X |
| 3,421,635 | 1/1969 | Bunger .............................. | 212/129 |
| 2,496,360 | 2/1950 | Stone ................................ | 294/96 |
| 3,306,646 | 2/1967 | Flora, Sr. ........................ | 294/88 X |
| 3,469,722 | 9/1969 | Burrows .......................... | 214/309 |

*Primary Examiner*—Gerald M. Forlenza
*Assistant Examiner*—Frank E. Werner
*Attorney*—Eldon H. Luther et al.

[57] ABSTRACT

A novel fuel bundle and control element assembly handling mechanism of a unitary construction. Mounted on the fuel lifting assembly of a refueling machine is a hudraulic control element assembly holding mechanism. A fuel bundle grapple mechanism passes through the fuel lifting assembly and is independently, vertically controllable with respect to the lifting assembly from a location on the refueling machine. Thus, the control element assembly and the fuel bundle may be gripped and manipulated independently, yet due to the interrelation of the grapple mechanisms, the control element assembly can be made to remain within the refueling machine lifting assembly during the refueling process.

7 Claims, 6 Drawing Figures

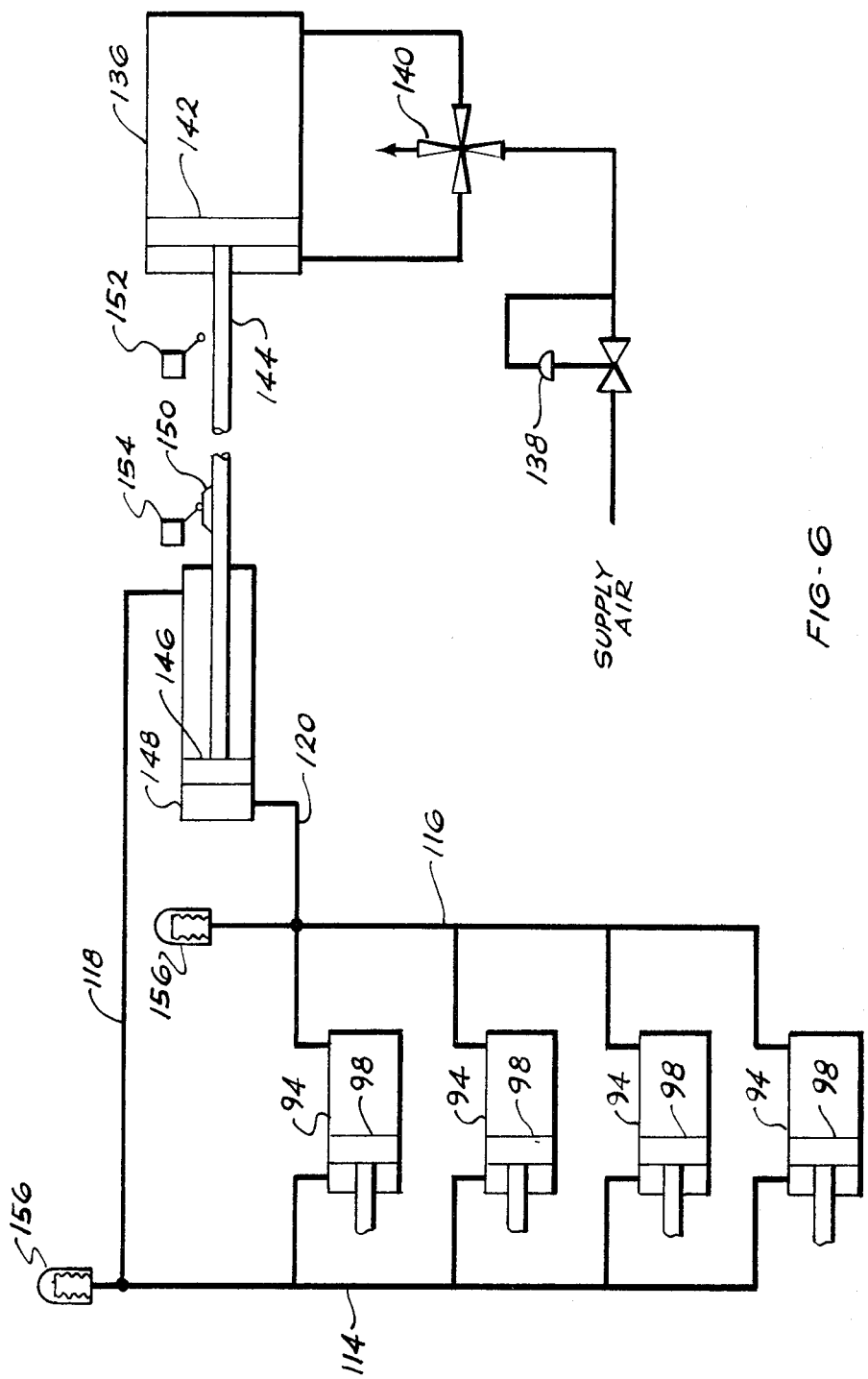

FUEL BUNDLE AND CONTROL ELEMENT ASSEMBLY HANDLING MECHANISM

BACKGROUND OF THE INVENTION

In a nuclear reactor which is to operate over an extended period of time, such as a reactor which is to be utilized for the generation of power, it is essential that provision be made for the periodic cycling of the fuel. Some reactors, for instance, have a zoned reactive core region in which there is fuel having varying degrees of burn up. At each recycling period (which might occur on the order of once a year), the fuel from the most depleted zone is removed from the reactor and transferred to a spent fuel storage area. The remaining fuel is then rearranged within the reactor core and fresh fuel is inserted to replace the depleted fuel which has been removed. It is, therefore, necessary to incorporate remote handling equipment into the plant design which is capable of carrying out these fuel transfer operations with a high degree of reliability. It is, of course, desirable that this equipment be simple in construction and operation, free from possible mechanical failures and capable of effecting a positive attachment to the fuel which is unable to accidentally drop the fuel.

The fuel is generally grouped into fuel bundles, each bundle having a control element assembly associated therewith. The control element assemblies are comprised of rods, containing poison material, variably positionable relative to the fuel bundles to control neutron flux and maintain a desired multiplication factor within the reactor core. In order to accomplish the replenishment of fuel within the core, it is necessary to first remove the spent fuel bundle with the control element assembly retained therein and store this assembly at some remote location, obtain a new fuel assembly and also store it, transfer the control element assembly to the new fuel bundle, reobtain the new fuel bundle with the control element assembly placed therein, and finally replace the fuel bundle within the active core region in a proper location. This procedure is presently carried out by independent handling mechanisms for the control element assembly and the fuel bundle.

SUMMARY OF THE INVENTION

In order to reduce the amount of equipment necessary to accomplish the refueling operation of a nuclear reactor as well as to reduce the number of steps necessary to accomplish the desired refueling operation, there is herein provided a novel fuel bundle and control element assembly handling mechanism of unitary construction. Mounted on the fuel lifting assembly of a refueling machine, such as that shown in U. S. Pat. No. 3,421,635 to R. C. Bunger, is an hydraulic control element assembly holding mechanism. A fuel bundle grapple mechanism passes through the fuel lifting assembly and around the control element assembly holding mechanism and is independently, vertically controllable with respect to the lifting assembly from a location on the fueling machine. Thus, the control element assembly and the fuel bundle may be gripped and manipulated independently by the respective holding and grapple mechanisms, yet due to the interrelation therebetween the control element assembly remains within the refueling machine lifting assembly during the refueling process.

BRIEF DESCRIPTION OF THE DRAWINGS

FIG. 6 is a schematic view of the hydraulic system for the unitary fuel bundle and control element assembly handling mechanism.

DESCRIPTION OF THE PREFERRED EMBODIMENT

Figure 1:
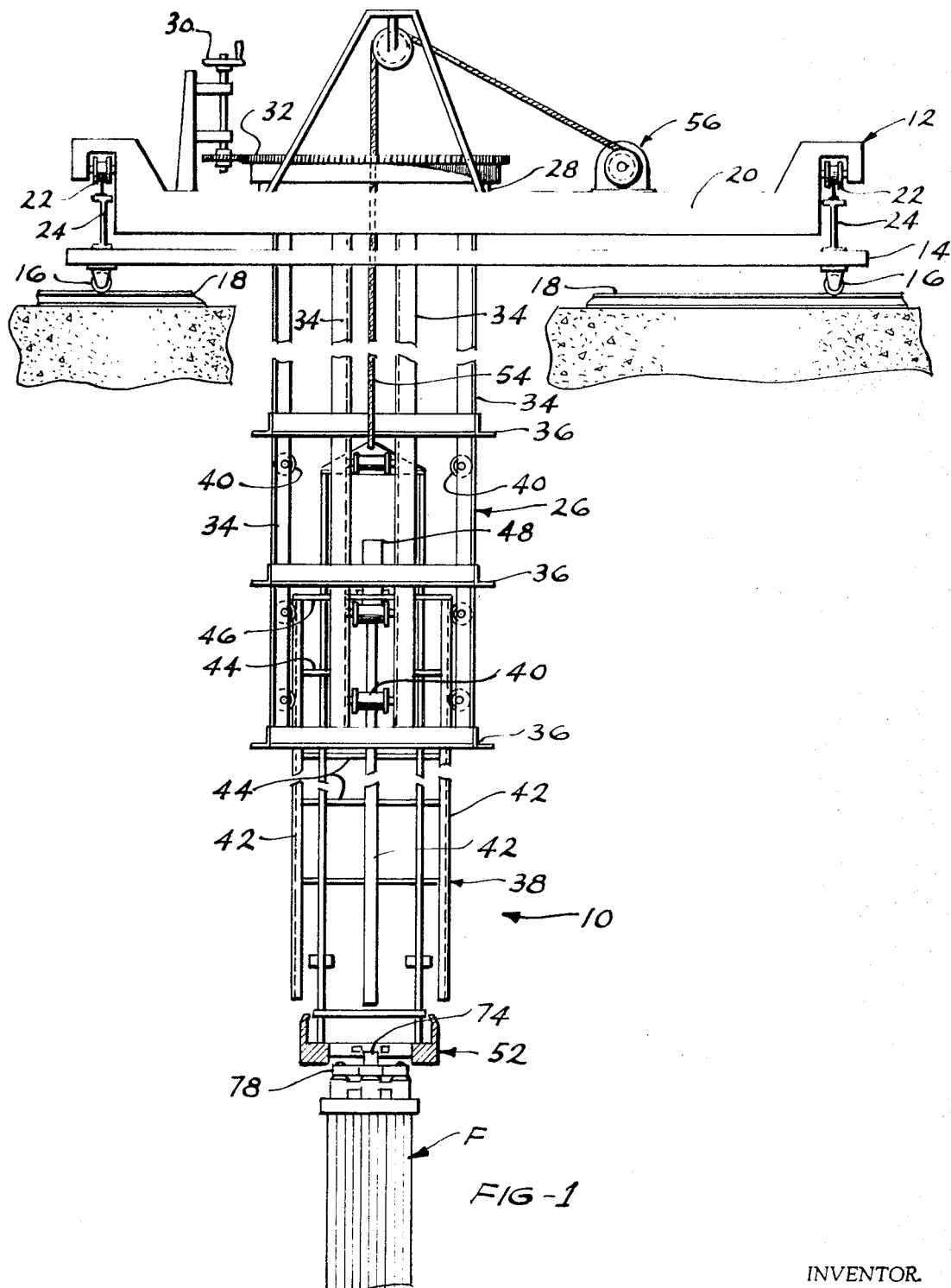
FIG. 1 is a side elevational view of a refueling machine incorporating the unitary fuel bundle and control element assembly handling mechanism of the present invention positioned over a typical fuel assembly.

Referring now the the drawings, FIG. 1 shows the fuel bundle and control element assembly handling mechanism 10 of this invention. The handling mechanism 10 is positionable by a refueling machine 12 which may be of the general type disclosed in U. S. Pat. No. 3,421,635 (described herein only to the extent necessary to fully understand the present invention). Mounted above the reactor vessel is a bridge 14 capable of a traverse motion on wheels 16 riding on tracks 18 to various points above the reactor vessel and the associated spent and fresh fuel storage areas. Mounted on the bridge 14 is a trolley 20 which is movable on wheels 22 and tracks 24 at right angles to the movement of the bridge 14 in order to locate the handling mechanism 10 over any desired position, as for example over a fuel bundle assembly F. A framework 26 is supported on a bearing 28 mounted on the trolley 20 and is positionable about its longitudinal axis by means of a rotation mechanism 30 which engages a gear 32 fixed to the framework 26. The framework 26 is comprised of vertical channels 34 and horizontal angle irons 36 to create a rigid structure thereof.

Figure 2:
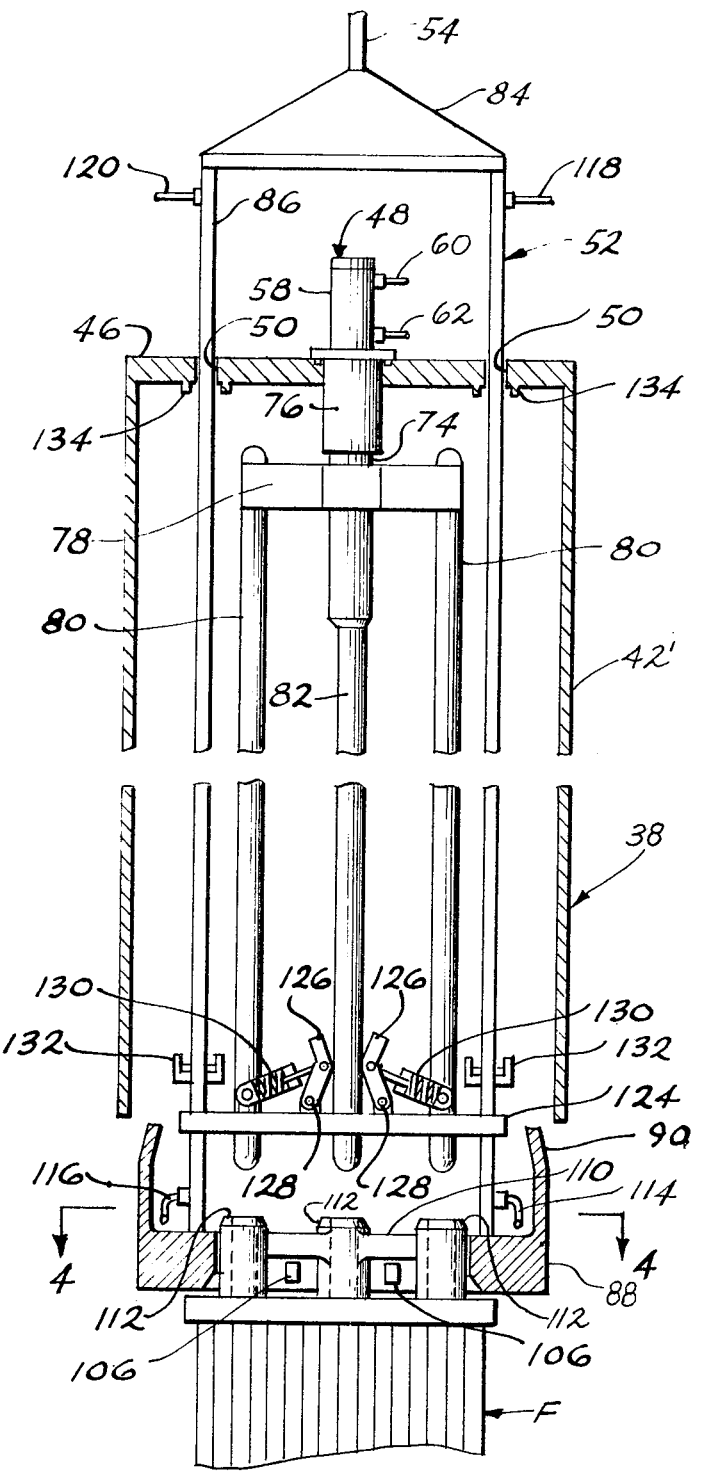
FIG. 2 is an enlarged side elevational view of the unitary fuel bundle and control element assembly handling mechanism showing an alternative arrangement for the lifting assembly of this invention.

Extending from and vertically movable within the framework 26 is a hoist box or lifting assembly 38. Guide wheels 40 mounted on the vertical channels 34 of the framework 26 serve to guide the movement of the lifting assembly 38, this movement being accomplished by any desired means (not shown). The lifting assembly 38 as shown in FIG. 1 is comprised of vertical channels 42 having horizontal support struts 44 to provide a rigid structure. Alternatively the rigid structure of the lifting assembly 38 could be formed by side walls 42' as shown in FIG. 2. The side walls 42' are particularly useful if the lifting assembly 38 is adapted for purge testing of the fuel assembly as discussed hereinbelow. The lifting assembly 38 additionally has a top plate 46 through which is mounted a control element assembly holding mechanism 48. The top plate 46 has passages 50 (see FIG. 2) through which a fuel bundle grapple mechanism 52 extends. The vertical positioning of the fuel bundle grapple 52 is controlled, for example, by a cable 54 attached to a winch mechanism 56 mounted on the refueling machine trolley 20.

Figure 3:
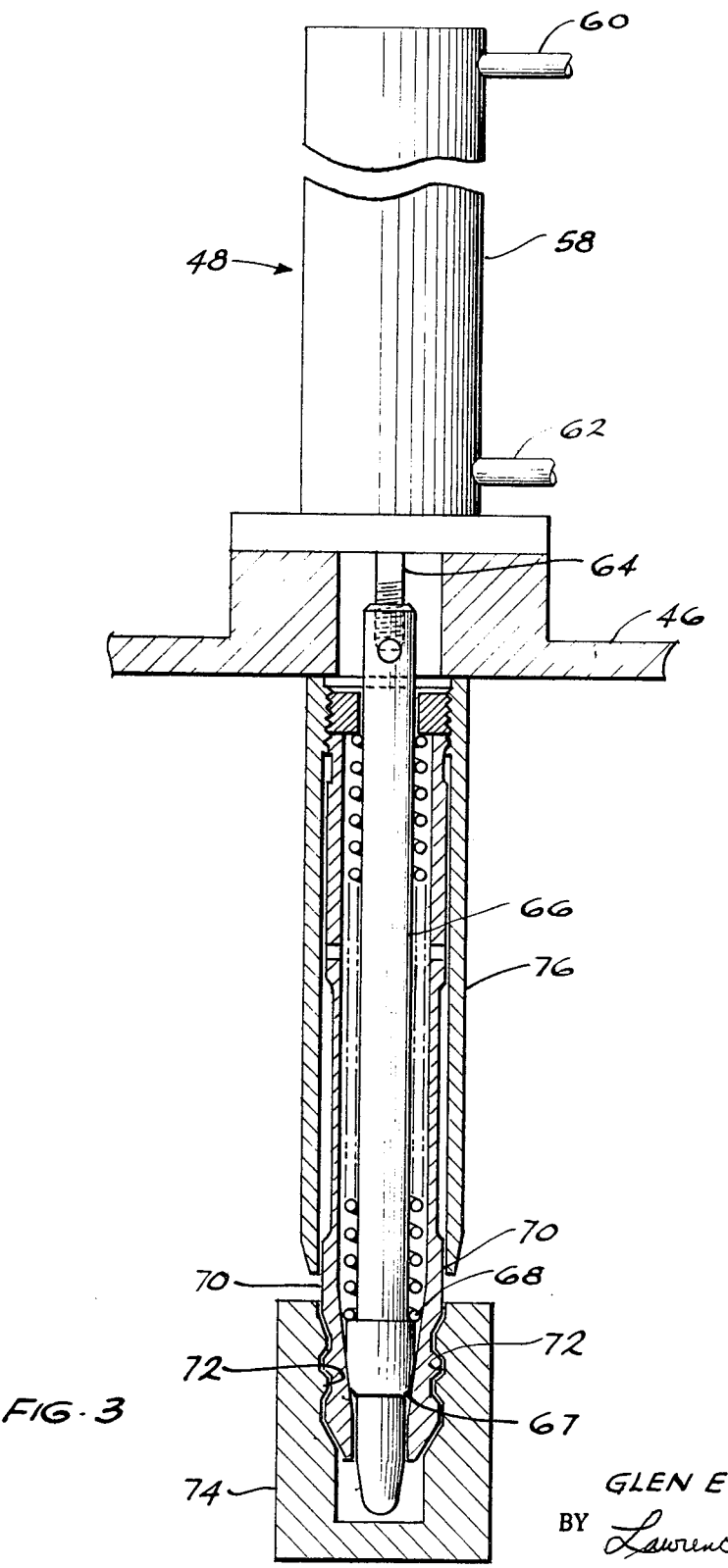
FIG. 3 is an enlarged side elevational view of the control element assembly grapple mechanism.

The control element assembly holding mechanism 48 is best shown in FIG. 3. An hydraulic cylinder 58 is mounted on the top plate 46 of the lifting assembly 38 and has hydraulic lines 60 and 62 connected thereto for controlling the extension of a rod 64 through a double acting piston (not shown). The rod 64 is attached to a plunger 66 which has a cam actuating head 67 biased by means of a spring 68 for safety considerations to a positive grapple engaging position. The head 67 controls the grappling function of longitudinal gripper fingers 70 which engage interior gripping surfaces 72 of a control element assembly hub 74. The fingers 70 are connected to and located substantially within a shield 76 for the protection thereof. The hub 74 is connected to the control element assembly which is comprised of a spider 78 (see FIG. 2) having control fingers 80 extending downwardly therefrom at the outer extremeties of the spider and a central control finger 82.

Figure 4:
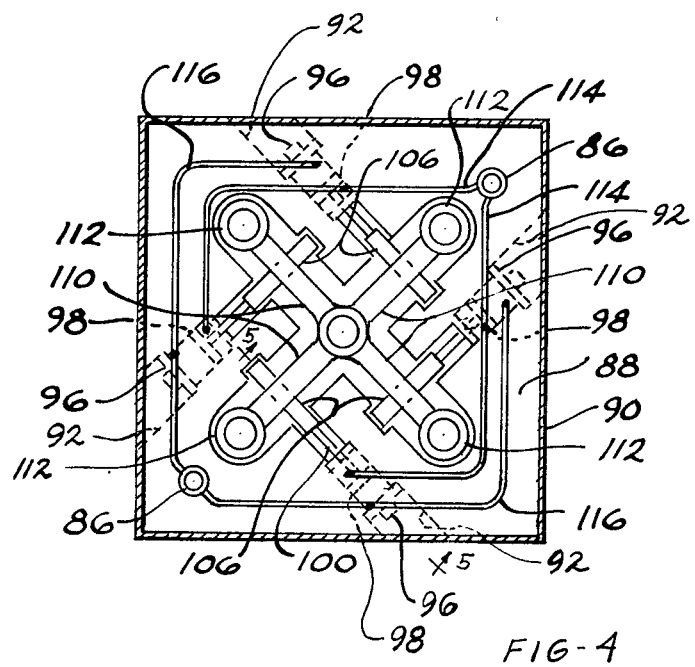
FIG. 4 is a plan view of the fuel bundle grapple mechanism along the lines 4–4 of FIG. 2.
Figure 5:
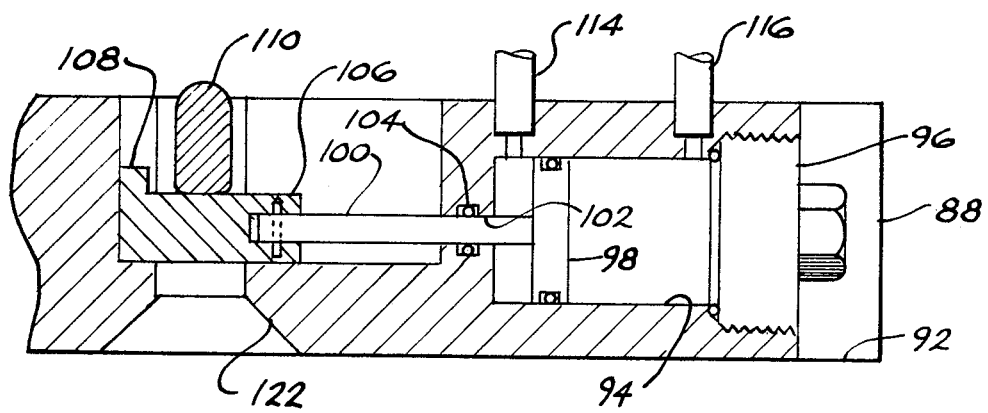
FIG. 5 is an enlarged side elevational view of the fuel bundle grapple mechanism along the lines 5–5 of FIG. 4.

The fuel bundle grappling mechanism 52 (see FIGS. 2, 4 and 5) is comprised of a hood 84 having hollow vertical standards 86 extending downwardly therefrom through the top plate 46 of the lifting assembly 38. The lower end of the standards 86 are connected to a grapple base 88 which has a guide shroud 90 extending upwardly therefrom so as to insure proper positioning between the base 88 and the lifting assembly 38 when the fuel bundle grapple mechanism 52 is withdrawn therein. The grapple base 88 has recesses 92 positioned about the circumference thereof. Hydraulic cylinders 94 are formed within the recesses 92 by means of seal caps 96 closing the recesses 92. Within the cylinders 94, there are positioned pistons 98 having rods 100 extending through bores 102 and seals 104 in the base structure 88. Connected to the opposite end of the rods 100 are lifting devices 106 which have anti-release lips 108. The lifting devices 106 are selectively positioned, in a manner to be explained hereinbelow, to underlie the webs 110 which connect the control element assembly guide tubes 112 of the fuel bundle F. Each of the pistons 98 is controlled by hydraulic lines 114 and 116 communicating between the hollow standards 86 and each of the cylinders 94, the standards 86 having appropriate hydraulic supply connections 118 and 120 at the upper portions thereof.

The base 88 of the grapple mechanism 52 has provisions for a lead-in chamfer 122 to assure the proper positioning of the control element assembly guide tubes 112 and fuel bundle webs 110 within the grapple mechanism 52. The grapple mechanism 52 additionally has a control element assembly finger guide mechanism 124 which supports center finger guides 126 for pivoting about the points 128. The guides 126 are spring biased by means of the loading mechanism 130 so as to assure proper alignment of the central control finger 82 with its appropriate guide tube 112. Located above the finger guide assembly 124 on the standards 86 are mechanical stops 132 which are adapted to engage the lips 134 on the top plate 46 when the grapple mechanism 52 (with the fuel bundle F and control element assembly) is raised. The interaction between the stops 132 and lips 134 positions the grapple mechanism 52 relative to the top plate 46 and the control element assembly relative to the holding mechanism 48 and may also be used to establish a pressure seal therebetween for the purpose of purge testing the fuel bundle F prior to operation within the reactor core (the purge operation forming no part of this invention).

The fuel cycling operation is carried out by the fuel bundle and control element assembly handling mechanism 10 in the following manner. The framework 26 and lifting assembly 38 are positioned over a selected fuel bundle F by manipulation of the bridge 14 and trolley 20 of the refueling machine 12. The lifting assembly 38 and the fuel bundle grapple mechanism 52 are lowered within the framework 26 by the appropriate means until the grapple base 88 engages the control element assembly guide tubes 112, with the tubes 112 being guided thereinto by the lead-in chamfer 122, and the grapple mechanism 52 rests on the fuel bundle F.

The fuel bundle grapple mechanism 52 will then be actuated in the following manner to positively engage the webs 110 to secure the grapple mechanism to the fuel bundle F. From a source of supply air a pressure regulator 38 (FIG. 6) will admit pressure through a 4-way valve 140 to a grapple actuator air cylinder 136. Within the cylinder 136 is a piston 142 which drives a shaft 144 having at its opposite end a piston 146 reciprocating in an hydraulic actuation cylinder 148. Positioning of the shaft 144 is indicated by means of a cam 150 on the shaft 144 which engages limit switches 152 and 154 when a grapple-open or grapple-closed position respectively is accomplished. The actuation cylinder 148 has hydraulic lines 118 and 120 which connect respectively to the hydraulic lines 114 and 116 (through hollow standards 86) which supply fluid to control the fuel bundle lifting devices 106 through action of pistons 98. The bore of the cylinder 148 is selected so as to be the same as the bore of each cylinder 94 while the stroke is selected to be approximately four times the stroke of the individual cylinders. In this manner, actuation of the piston 142 will result in a uniform action of each of the pistons 98 to accomplish a positive movement of the lifting device 106 and provide a ready means for accurately determining the full engagement or release of the lifting device. For safety considerations, the double action of the cylinder 148 assures that the devices 106 can be actuated even on a break in either hydraulic line. Each of the hydraulic lines 114 and 116 has an expansion device 156 connected thereto so as to permit a limited expansion of the hydraulic fluids due to varying temperature conditions.

When the pistons 98 are actuated to secure the lifting device 106 under the fuel assembly webs 110, the entire fuel bundle assembly F (including the control element assembly) may be lifting from the reactor core by raising the lifting assembly 38 and fuel bundle grapple mechanism 52. The anti-release lips 108 assure the retention of the lifting devices 106 beneath the webs 110 during the entire period in which the fuel bundle is being lifted, even if a release signal is inadvertently given. The entire assembly may then be carried to a spent fuel storage area by manipulation of the refueling machine 12. Once the pistons 98 have been actuated to secure the fuel bundle F, the control element assembly holding mechanism 48, the gripping portion of which is located within the control element assembly hub 74, is actuated from a suitable hydraulic source. The cylinder 58 has fluid supplied through line 60 activates the plunger 66 in order to expand the fingers 70 into a gripping arrangement with the interior surfaces 72 of the control element assembly hub 74 to positively retain the control element assembly within the lifting assembly 38. At the appropriate storage point, the fuel bundle grapple mechanism 52 may be lowered to place the fuel bundle F in the storage area, the lifting assembly 38 being maintained in its retracted position. Because of the orientation of the control element assembly holding mechanism 48 with the lifting assembly 38, the control element assembly will be removed from the fuel bundle F and retained within the assembly 38.

Operation of the air cylinder 136 to move pistons 142 and 146 will control release of the fuel bundle F by moving the lifting means 106 under the action of pistons 98 from beneath the webs 110. The refueling machine 12 may then be moved to the fresh fuel storage area and positioned to enable the fuel bundle grapple mechanism 52 to engage a fresh fuel bundle. The lifting devices 106 will then be repositioned under the webs 110 of the new fuel bundle and the mechanism 52 may be lifting within the lifting assembly 38 so that the control element assembly retained therein will be inserted within the new fuel bundle. Correct positioning of the fingers 80 and 82 within the control element assembly guide tubes 112 is assured by means of the finger guide assembly 124. The spring loading mechanisms 130 cause the center finger guides 126 to engage the center finger 82 of the control element assembly for such accurate positioning relative to its respective guide tube 112.

After the new fuel bundle is fully raised within the lifting assembly 38, the control element assembly holding mechanism 48 will be actuated from the suitable hydraulic source through line 62 to withdraw the plunger 66 and allow the fingers 70 to disengage the interior surfaces 72 of the control element assembly hub 74. The control element assembly will thus be supported in its proper position within the new fuel bundle. The refueling machine 12 may then be manipulated to a position above the reactor core and the new fuel bundle inserted therein by lowering of the lifting assembly 38 and fuel bundle grapple mechanism 52. When the new fuel bundle F is inserted in its proper position, the lifting devices 106 may be retracted and the unitary fuel bundle and control element assembly handling mechanism 10 removed for repositioning with respect to the next fuel bundle to be changed.

From the foregoing, it is apparent that there is herein provided a novel fuel bundle and control element assembly handling mechanism 10 which accomplishes refueling of a nuclear reactor with a minimum of steps utilizing equipment of simple and reliable construction. A control element assembly holding mechanism 48 is connected to the lifting assembly 38 of the refueling machine 12 so that the control element assembly may be selectively retained within the lifting assembly 38 during the manipulation of the fuel bundle. Fuel bundle manipulation for recycling is carried out by means of a fuel bundle grapple mechanism 52 which extends through and moves relatively to the lifting assembly 38.

While this preferred embodiment of the invention has been shown and described, it will be understood that it is merely illustrative and that changes may be made without departing from the scope of the invention as claimed.

What is claimed is:

1. A unitary fuel bundle and control element assembly handling mechanism operable from a traveling refueling machine having a fuel lifting assembly, said handling mechanism comprising: a control element assembly holding means mounted on said fuel lifting assembly for selectively retaining a control element assembly therein; a fuel bundle grapple means passing through said fuel lifting assembly, said fuel bundle grapple means including a hood, a plurality of hollow vertical standards connected to and extending downwardly from said hood, a source of fluid pressure, a fluid circuit connecting said source to the interior of said standards, and a fluid actuated grappling means in fluid communication with said standards for selective engagement with a fuel bundle; and vertical adjusting means for independently controling the relative positioning of said fuel bundle grapple means with respect to said fuel lifting assembly, said vertical adjusting means being connected to said hood of said fuel bundle grapple means.

2. The apparatus of claim 1 wherein said grappling means includes a base, a plurality of cylinders located within said base, a double acting piston in each of said cylinders, and lifting means for selective positive engagement with a fuel bundle, said lifting means being connected to said pistons for selective actuation thereby.

3. The apparatus of claim 2 wherein said lifting means have anti-release means to prevent accidental disengagement of said lifting means from the fuel bundle.

4. The apparatus of claim 1 wherein said fuel bundle grapple means further includes guide means assuring proper positioning of the control element assembly and the fuel bundle.

5. The apparatus of claim 1 wherein said fuel bundle grapple means further includes stop means positioned on said vertical standards for engagement with said lifting means to prevent overtravel of said fuel bundle grapple means with respect to said lifting means.

6. In a refueling machine for a nuclear reactor having a traveling platform and a vertically adjustable fuel lifting assembly extending therefrom, said fuel lifting assembly including a top plate having a plurality of openings therethrough, a unitary fuel bundle and control element assembly handling mechanism comprising: a first fluid actuated means for holding a control element assembly, said first fluid means being mounted on said fuel lifting assembly for movement therewith; a second fluid actuated means for gripping said fuel bundle, said second fluid means including a hood, a plurality of hollow vertical standards extending from said hood through said openings in said fuel lifting assembly top plate for movement relative thereto, a fuel bundle grapple means in fluid communication with said standards for selectively gripping a fuel bundle, and guide means located on said standards for assuring proper positioning between a control element assembly and a fuel bundle; and an independent hoist mechanism connected to said hood of said second fluid actuated means for controlling the relative position of said second fluid actuated means with respect to said fuel lifting assembly.

7. The apparatus of claim 6 wherein said fuel bundle grapple means includes a base, a plurality of cylinders located within said base, a double acting piston in each of said cylinders and lifting means actuated by said pistons to effect positive engagement with a fuel bundle, said lifting means having anti-release lips to prevent accidental disengagement of said lifting means from the fuel bundle.

* * * * *